(12) United States Patent
Dupuie et al.

(10) Patent No.: US 6,840,864 B2
(45) Date of Patent: Jan. 11, 2005

(54) CONSTANT VELOCITY JOINT ASSEMBLY

(75) Inventors: Bradley A. Dupuie, Bay City, MI (US);
Jeffrey A. Sutter, Chesaning, MI (US);
Aranda Rogerio, Chih (MX)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/649,022

(22) Filed: Aug. 27, 2003

(65) Prior Publication Data

US 2004/0077411 A1 Apr. 22, 2004

Related U.S. Application Data

(60) Provisional application No. 60/406,284, filed on Aug. 27, 2002.

(51) Int. Cl.[7] ................................................ F16D 3/10
(52) U.S. Cl. ........................ 464/118; 464/905; 403/205
(58) Field of Search ........................ 464/116–118, 125, 464/905; 403/205

(56) References Cited

U.S. PATENT DOCUMENTS

| 724,068 | A | 3/1903 | Williams |
|---|---|---|---|
| 1,562,080 | A | 11/1925 | Chilton |
| 2,755,641 | A | 7/1956 | Dunn |
| 3,470,712 | A | 10/1969 | Geisthoff et al. |
| 4,257,243 | A | 3/1981 | Herchenbach |
| 4,436,515 | A | 3/1984 | Mallet |
| 4,464,136 | A | 8/1984 | Konrad et al. |
| 4,490,125 | A | 12/1984 | Konrad et al. |
| 4,540,383 | A | 9/1985 | Taig |
| 4,781,662 | A | 11/1988 | Mayhew et al. |
| 4,799,817 | A | 1/1989 | Geisthoff |
| 4,997,407 | A | 3/1991 | Kretschmer et al. |
| 5,419,740 | A | 5/1995 | Koyari et al. |
| 6,024,645 | A | 2/2000 | Tomaru et al. |
| 6,203,438 | B1 | 3/2001 | Kirson |

FOREIGN PATENT DOCUMENTS

SU            1137263 A    *   1/1985   ................. 464/116

OTHER PUBLICATIONS

Machinery's Handbook, 25th ed., New York, International Press, 1996. p. 2239. TJ151.M3 1996.*
Universal Joint and Driveshaft Design Manual, AE–7, Warrendale, PA, Society of Automotive Engineers, 1979. p. 327. TJ1079.S62 1979.*

* cited by examiner

*Primary Examiner*—Greg Binda
(74) *Attorney, Agent, or Firm*—Michael D. Smith

(57) ABSTRACT

A cardan joint is provided with a centering disk that is moveable relative to the intermediate coupling member. The invention also provides a centering disk including a plurality of tabs to support movement of the centering disk relative to the intermediate coupling member. The invention also provides a spring positioned in the centering disk to outwardly bias the ends of the shaft to maintain the contact between the shaft and the centering disk. The invention also provides means for biasing the centering disk relative to the intermediate coupling member.

16 Claims, 14 Drawing Sheets

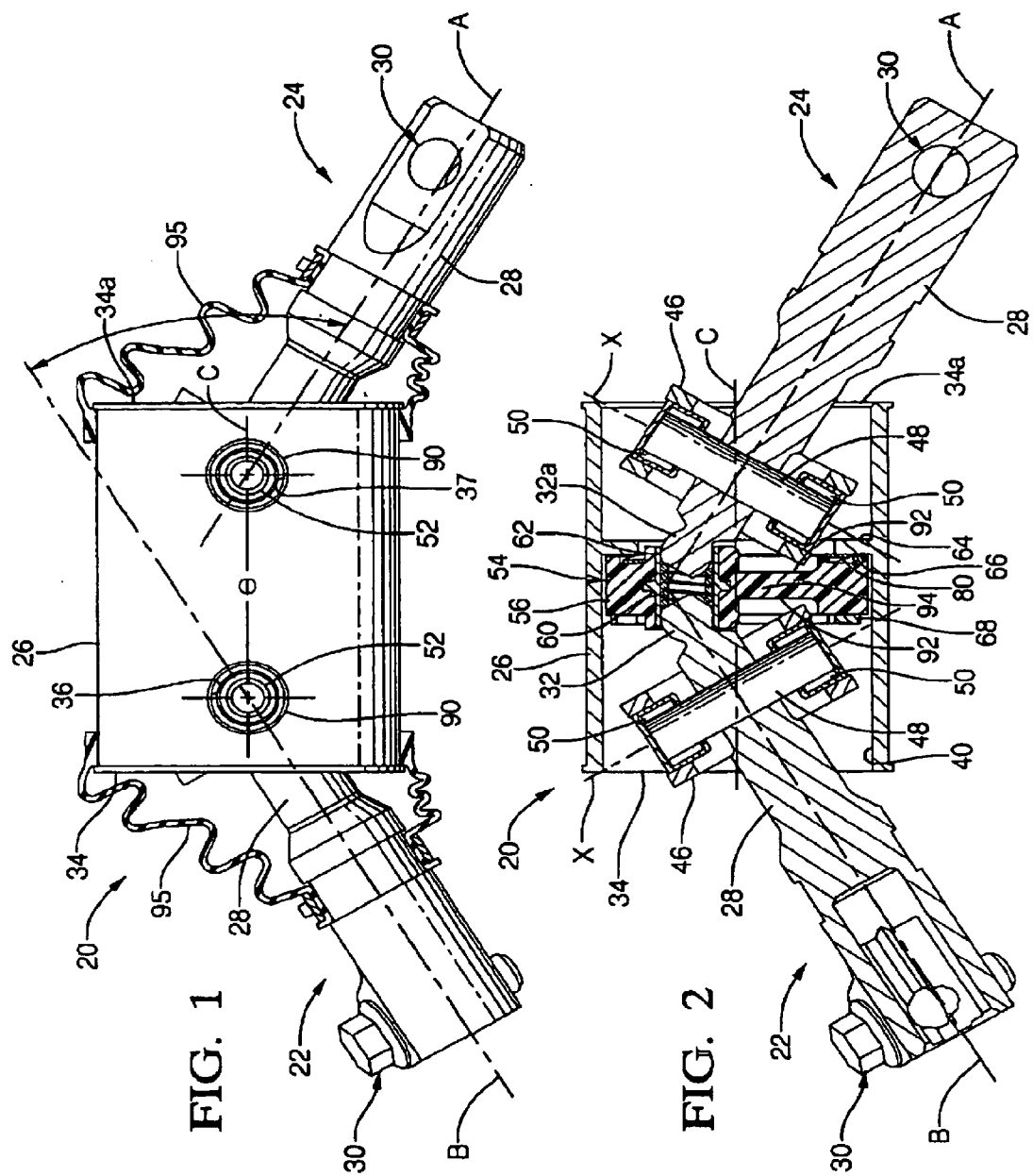

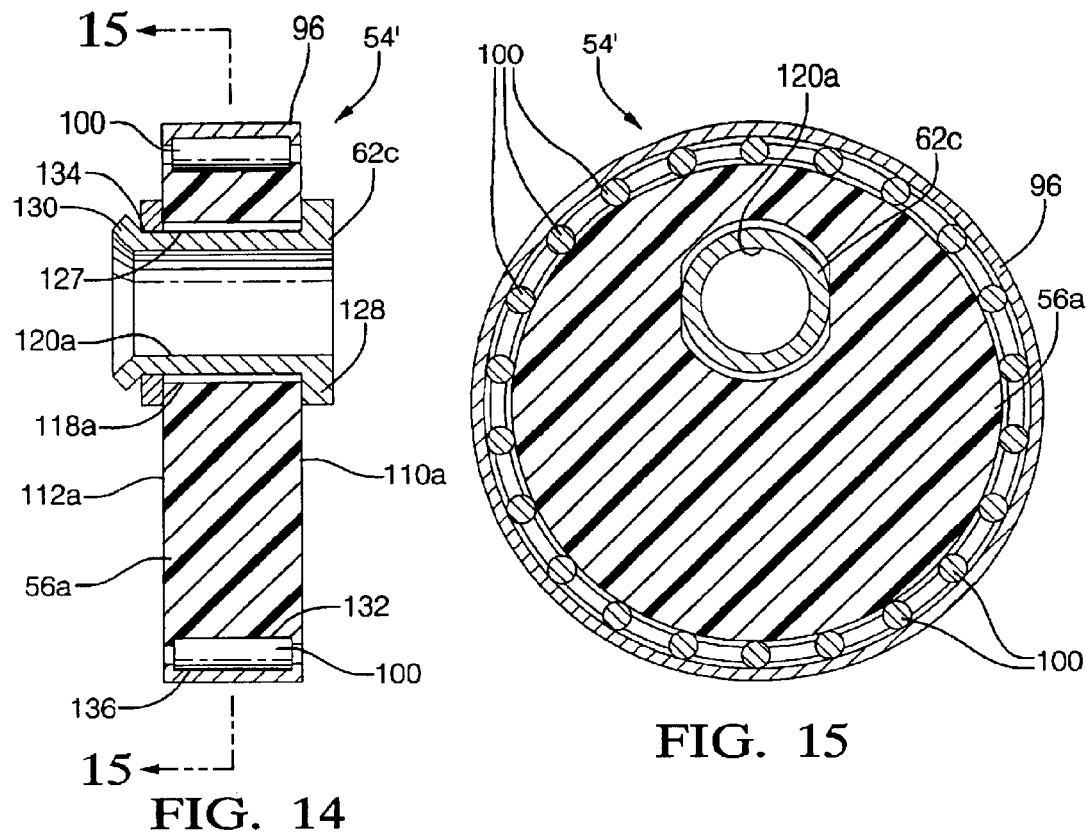
FIG. 14
FIG. 15
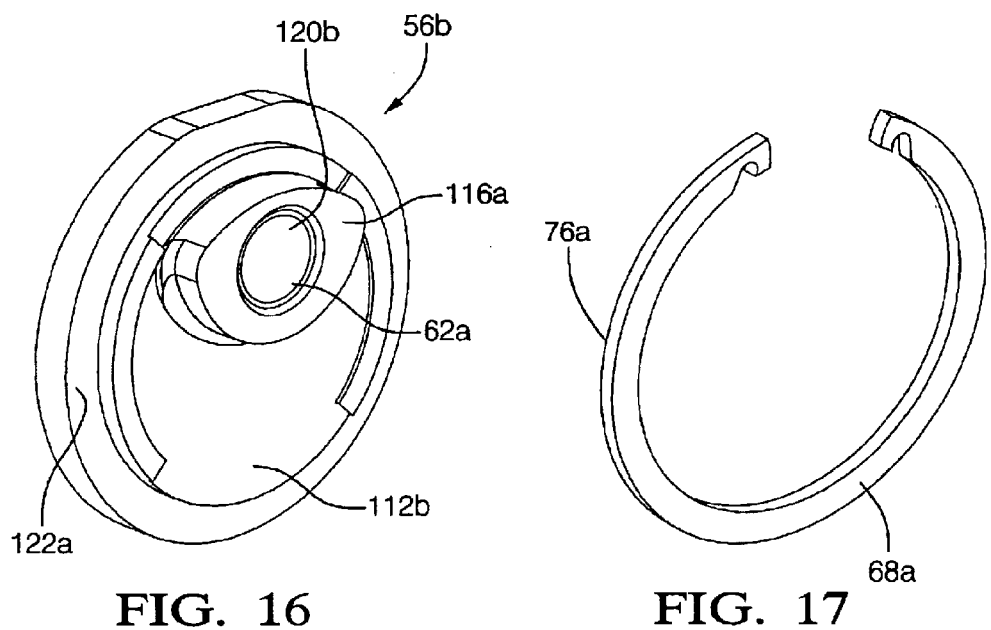
FIG. 16
FIG. 17

CONSTANT VELOCITY JOINT ASSEMBLY

This application claims priority to U.S. Provisional Patent Application No. 60/406,284, filed Aug. 27, 2002.

TECHNICAL FIELD

The invention relates to a double universal joint or cardan joint and, more specifically, the invention relates to a centering disk positionable between the two shafts of the cardan joint.

BACKGROUND OF THE INVENTION

It can be desirable to communicate rotation between a first shaft and second shaft extending away from one another at an angle. The first shaft can be a driving shaft and the second shaft can be a driven shaft. The shafts can be connected to one another with a single universal joint, an arrangement known as a Hooke joint. However, one drawback of a Hooke joint is that the driven shaft will not rotate at a uniform angular velocity. In particular, during revolution the driven shaft will experience angular acceleration and deceleration in response to relatively constant angular velocity of the driving shaft.

A cardan joint engages two shafts with respect to another with an intermediate, revolving coupling member. First and second universal joints connect the first and second shafts, respectively, to the intermediate coupling member. The cardan joint arrangement imparts constant velocity to the driven shaft. The cardan joint can include a centering plate positioned in the intermediate coupling member that engages both shaft ends to generally maintain the same output angle of the driven shaft as the input angle of the driving shaft. The centering plate can define an aperture for receiving rounded ends of the shafts. Alternatively, the centering plate can define rounded projections receivable in apertures defined by the shafts.

Users of cardan joints can require a product for applications having high joint angles and/or a joint to enable the angles defined between each shaft and the intermediate coupling member to be equal to minimize peak-to-peak torque variation. These two design parameters are primarily driven by vehicle packaging issues. In these applications, the current production universal joints may not work because of limitations in angular capability and phasability.

SUMMARY OF THE INVENTION

The present invention provides a cardan joint having a centering disk with a receiving portion engaging both shaft ends that is longitudinally moveable with respect to the intermediate coupling member. The receiving portion can include a bushing defining an aperture and the shaft ends can include portions receivable in the bushing to engage the shafts with the receiving portion. The freedom of limited movement of the receiving portion can reduce lashing of components of the joint as well as wiggling or orbiting motion of the intermediate coupling member. The invention can also include a biasing device, such as a spring, to urge the receiving portion to a desired position in the intermediate coupling member.

The present invention also provides a cardan joint having a plurality of support tabs for supporting bearing engagement between the centering disk and the intermediate coupling member. The support tabs can extend radially or longitudinally from the centering disk. Space defined between the support tabs can provide pockets or cavities for maintaining lubricant. The support tabs can minimize the contact area between the centering disk and the intermediate coupling member to reduce friction between the two components of the cardan joint.

The present invention also provides a cardan joint with a spring positioned in the intermediate coupling member between the ends of the shafts. The spring can urge the ends of the shaft outwardly from one another. The biasing force delivered by the spring can urge the ends of the shaft into substantially continuous contact with receiving portion of the centering disk to reduce lashing of the centering disk and the intermediate coupling member.

The present invention also provides a cardan joint having a plastic centering disk and a metal support washer. The plastic centering disk can be slidable relative to the metal support washer. The metal support washer can be positioned between the intermediate coupling member and the centering disk to absorb high contact forces that can develop between the intermediate coupling member and the centering disk.

Other applications and features of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a partial cross-sectional side view of a first embodiment of a centering disk according to the present invention;

FIG. 2 is a cross-sectional side view of the embodiment of the invention shown in FIG. 1;

FIG. 14 is a side cross-sectional view of the centering device shown in FIGS. 12 and 13;

FIG. 15 is a front cross-sectional view of the centering device shown in FIGS. 12–14;

FIG. 16 is a perspective view of a third embodiment of a centering disk according to the present invention;

FIG. 17 is a perspective view of a second embodiment of a retaining clip according to the present invention;

DESCRIPTION OF THE PREFERRED EMBODIMENT

Figure 3A:
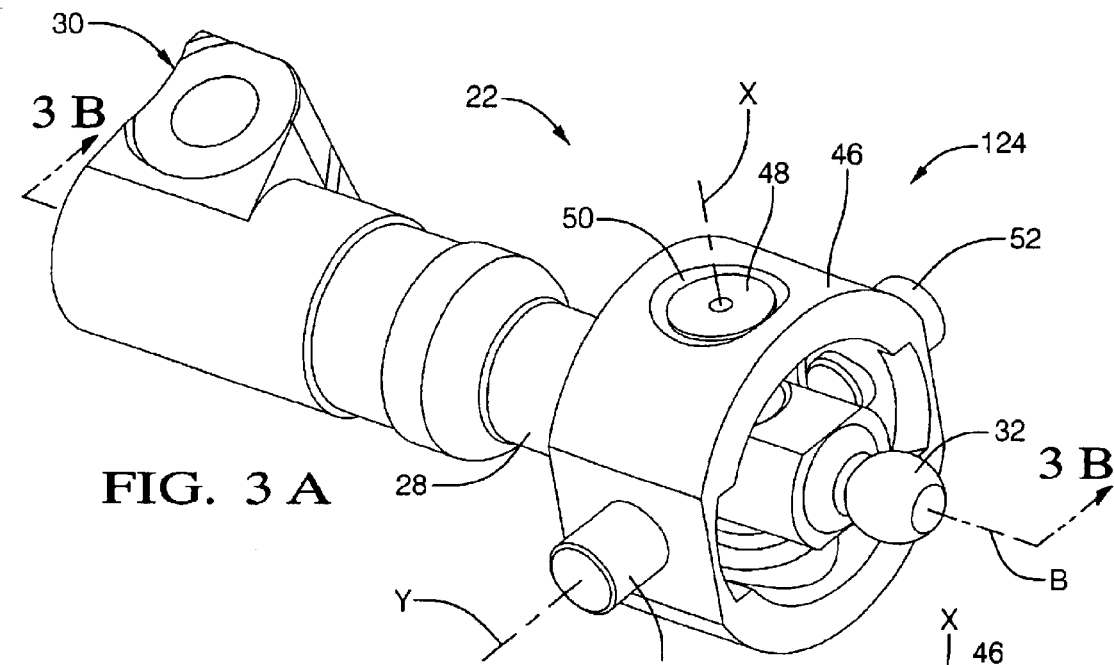
FIG. 3A is a perspective view of a shaft assembly according to the embodiment of the invention shown in FIG. 1.
Figure 3B:
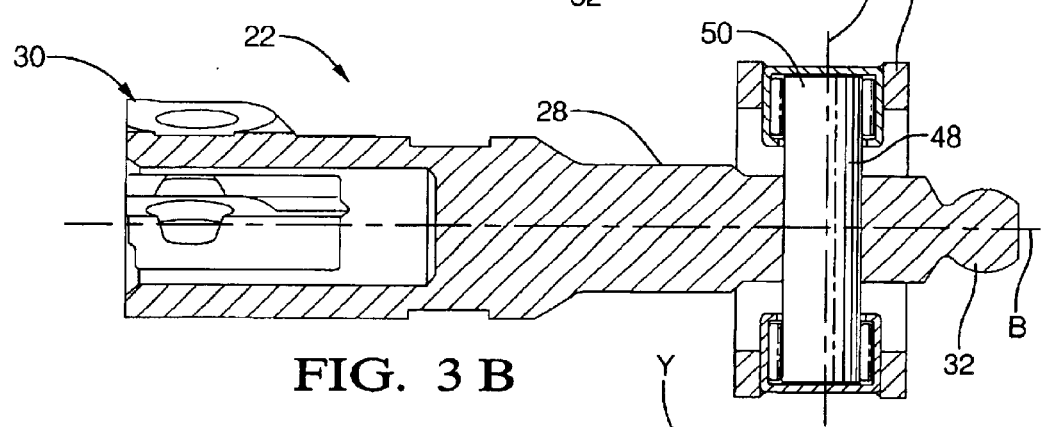
FIG. 3B is a cross-sectional view of the shaft assembly shown in FIG. 3A.
Figure 3C:
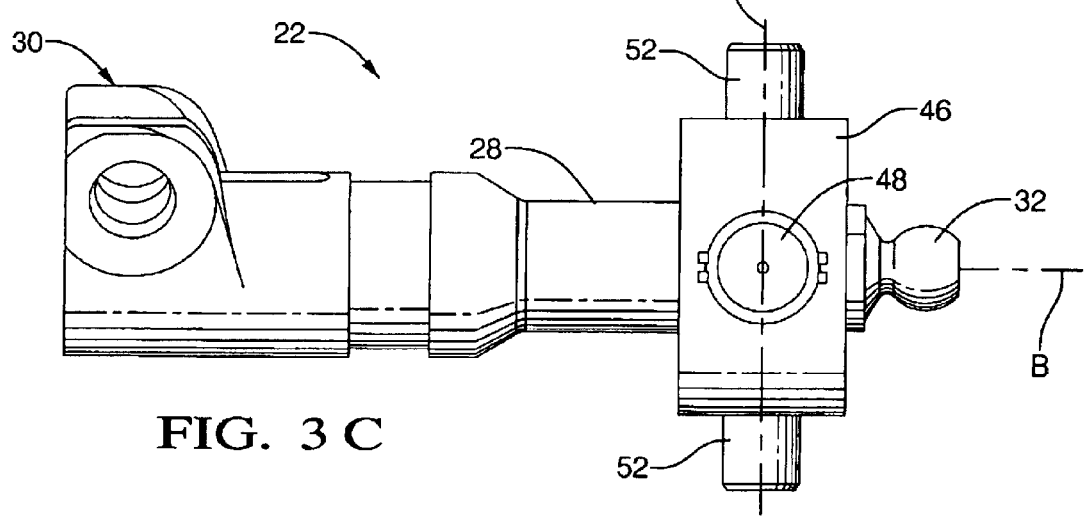
FIG. 3C is a side view of the shaft assembly shown in FIGS. 3A and 3B.
Figure 4:
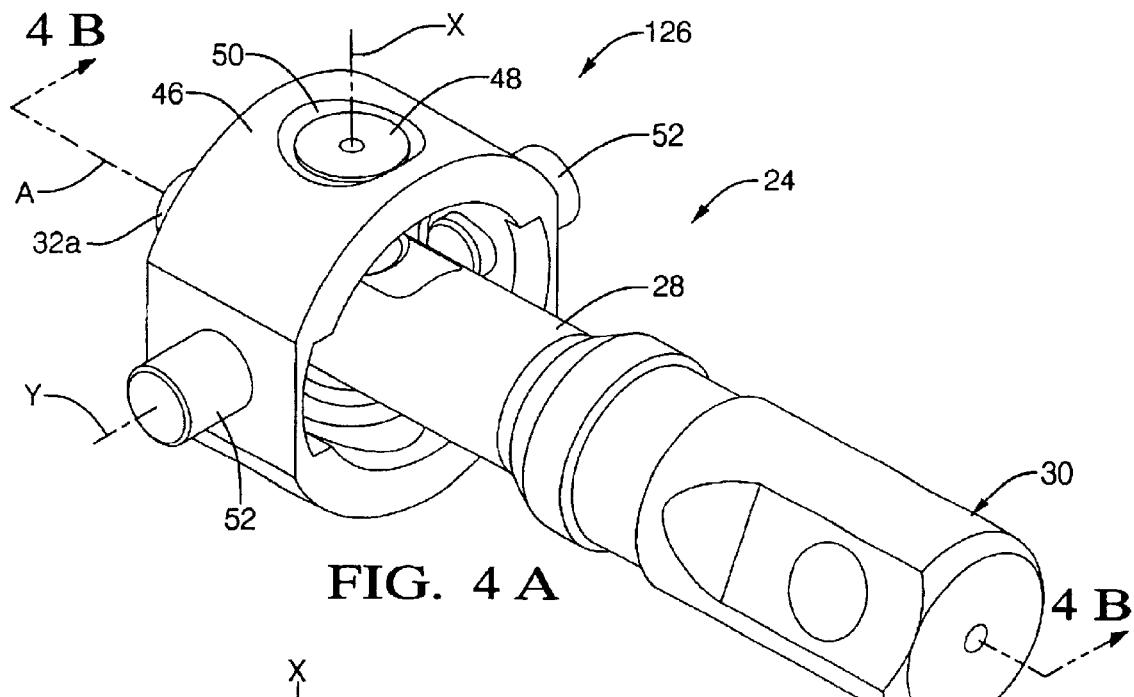
FIG. 4A is a perspective view of a second shaft assembly according to the embodiment of the invention shown in FIG. 1.
FIG. 4B is a cross-sectional view of the shaft assembly shown in FIG. 4A.
FIG. 4C is a side view of the shaft assembly shown in FIGS. 4A and 4B.
Figure 4:
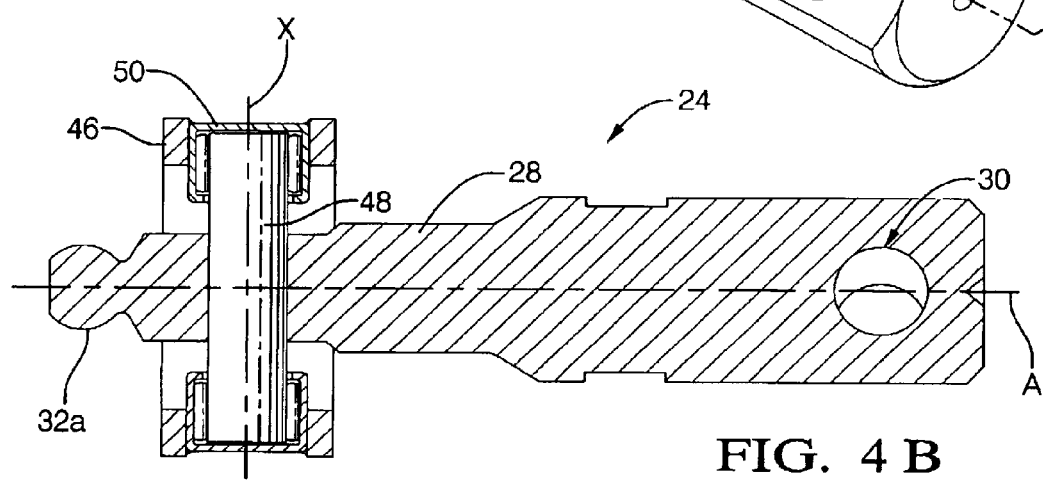
Figure 4:
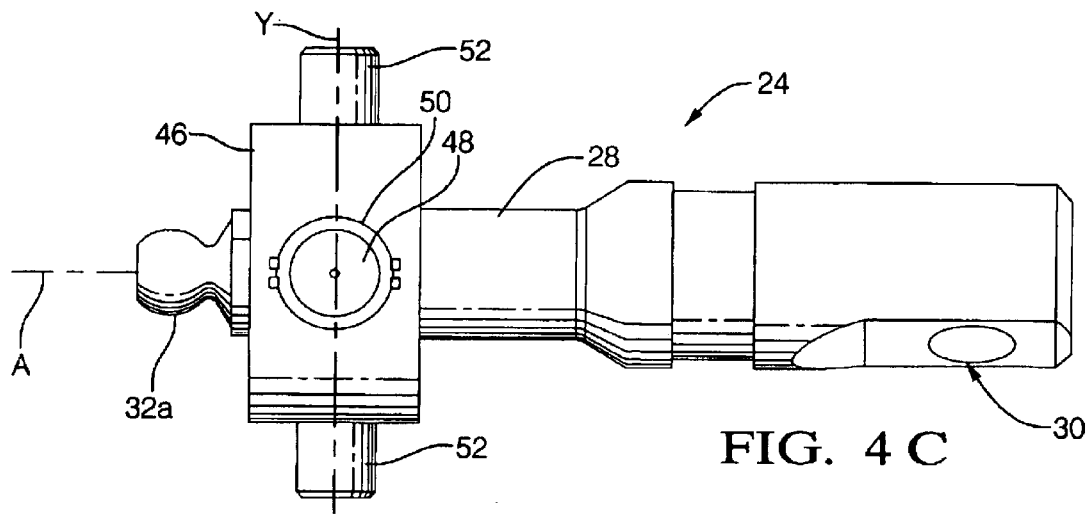

Referring now to FIG. 1, a constant velocity joint assembly 20 constructed according to the invention includes first and second shaft assemblies 22, 24 which are joined in articulated, jointed manner by an outer housing or sleeve or intermediate coupling member 26 defining an aperture 40, wherein torque from one shaft assembly 22 is transmitted to the second shaft assembly 24 through the sleeve 26 through an angle. As explained further below, the joint assembly 20 is capable of operating over a range of angles, but for a given application the effective angle between the respective axes of the shaft assemblies 22, 24 can be fixed at a predetermined angle.

The present invention provides a constant velocity joint assembly 20 which maintains constant velocity at a large joint angle, for example 58 to 68 degrees, while substantially eliminating or minimizing any wobbling or lash between the components of the joint assembly that are subjected to torque and bending loads in operation. The invention can achieve the above considerations in a joint having a small package size.

FIGS. 1 and 2 show the joint assembly 20, with FIG. 2 being a cross section through the joint of FIG. 1. As shown with the assistance of FIGS. 3–6, the shaft assemblies 22, 24 each have a shaft 28 that extends along respective axes A, B, respectively, and provided at axially outer ends with connecting features 30 which enable the free axial ends of the shaft assemblies 22, 24 to be joined to the respective driving and driven shafts (not shown) whose axes can be offset at a predetermined, fixed angle (for example, between 58 and 68 degrees) which, in use, is the angle that the axes A, B are fixed through the connection of the shaft assemblies 22, 24 to the respective shafts (not shown). In this way, the joint assembly 20 can operate as an intermediate shaft between torque-transmitting drive and driven shafts (not shown) mentioned above.

The shafts 28 each terminate at their axially inner ends in a stud ball or end 32, 32a. The inner ends 32, 32a of the shafts 28 are received in the sleeve 26 through opposite open ends 34, 34a thereof. The sleeve 26 preferably comprises a generally cylindrical, open-ended housing having two sets of axially aligned pin holes or openings 36, 36a, 37, 37a as best shown in FIG. 6.

Turning now particularly to FIGS. 3A–C and 4A–C, shaft assembly 22 includes a universal joint 124 and shaft assembly 24 includes a universal joint 126. Each of the u-joints 124, 126 includes an inner ring 46. Each ring 46 is arranged concentrically about its respective shaft 28 and is coupled in articulated manner to its respective shaft 28 by means of a cross pin 48 which extends through a bore in each of the shafts 28 and is coupled at its axial free ends by bearings 50 to the inner rings 46, such that the inner rings 46 are able to pivot about a central axis X of the cross pin 48 relative to the shaft 28 to which it is attached. Each of the inner rings 46 carries a set of bearing pins 52 which are welded or otherwise fixed to the inner ring 46 and project outwardly from the ring 46 along an axis Y which is perpendicular to the axis X of the cross pins 48, and which further lies in the same plane so that the axes X, Y of each shaft assembly 22, 24 intersect one another and the respective axes A, B of the shafts 28 at a common point.

The bearing pins 52 are received in the pin holes 36, 36a, 37, 37a of the sleeve 26 to enable the inner rings 46 to pivot relative to the sleeve 26 about the axes Y of the bearing pin 52. In this manner, the shaft 28 of each shaft assembly 22, 24 is free to pivot in all directions relative to the sleeve 26, and constrained only by contact of the shafts 28 with the side walls of the sleeve 26 while being fixed against rotation relative to the sleeve 26. In this way, the joint assembly 20 is able to transmit torque between the shaft assemblies 22, 24 and sleeve 26 through an angle between the axes A, B of the shafts 28.

Figure 5:
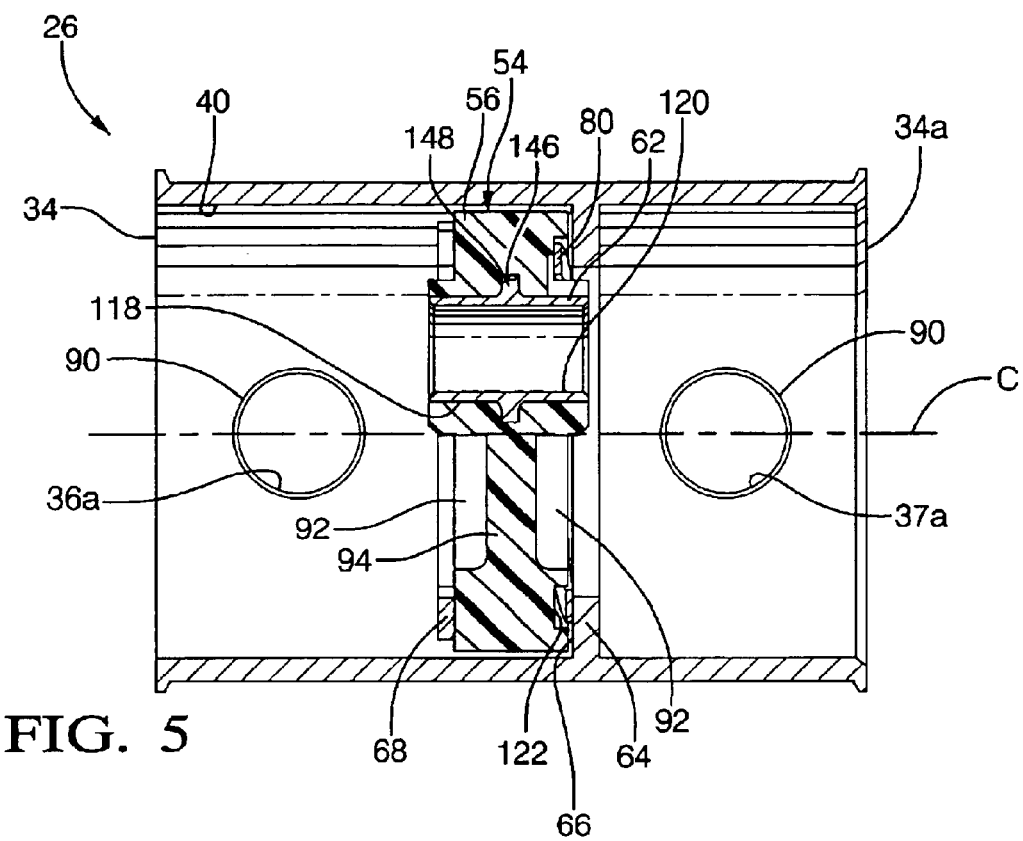
FIG. 5 is a side cross-sectional view of a centering disk positioned in an intermediate coupling member according to the embodiment of the invention shown in FIG. 1.
Figure 6:
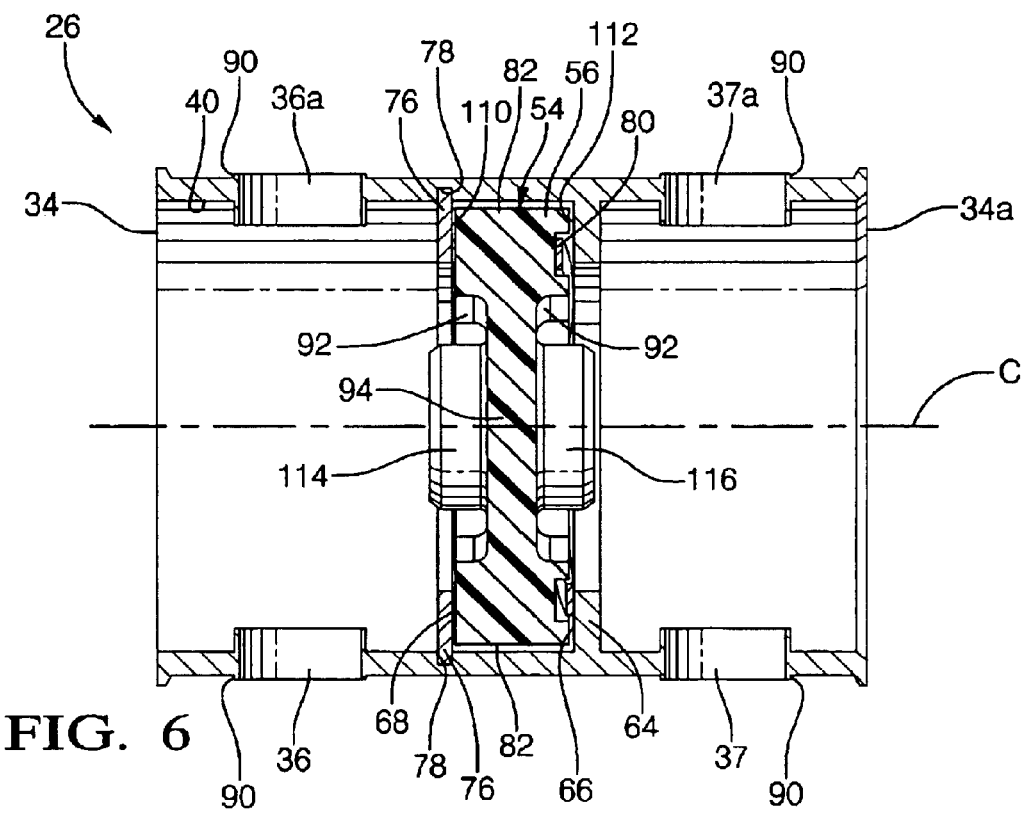
FIG. 6 is a top cross-sectional view of a centering disk positioned in an intermediate coupling member of the embodiment shown in FIG. 1 and is a cross-sectional view offset 90° from the cross-sectional view shown in FIG. 5.

Referring now to FIGS. 2 and 5–10, the shafts 28 can be fixed relative to one another within the sleeve 26. The joint assembly 20 includes a centering device 54 which can maintain the angular positions of the shafts 28 relative to one another such that, in operation, the output angle of the joint is the same as that of the input angle through the shaft assemblies 22, 24. The centering device 54 preferably comprises a centering disk 56 disposed within the sleeve 26 between the ends 34, 34a of the sleeve 26. The centering disk 56 can include an aperture 118 which is offset with respect to a central axis C of the sleeve 26. The disk 56 includes a receiving portion for receiving the ends 32, 32a of the shafts 28. The receiving portion can be the aperture 118. Alternatively, the receiving portion can include a bushing 62 having an aperture 120. The central axis C intersects the shaft axes A, B and the pin axes X, Y at the pivot center point of each of shaft assemblies 22, 24. The ends 32, 32a of the shafts 28 can extend into the aperture 120 from opposite sides, as best shown in FIG. 2. The aperture 120 of the bushing 62 contacts the ends 32, 32a to restrain and support the inner ends 32, 32a of the shafts 28 against relative radially movement, substantially fixing them in a specified angular relationship relative to one another. The aperture 120 preferably defines an inner diameter is equal to or slightly larger than the outer diameter of the ends 32, 32a which are preferably part-spherical in configuration. The centering disk 56 is preferably fabricated of a plastics material, such as DELRIN™, which is formed by injection molding or machining. The bushing 62 is preferably formed of a sintered steel alloy containing copper, although metallic and non-metallic materials may be suitable. Preferably, the socket bushing 62 is molded in place, or in situ, during the formation of the centering disk 56, as best shown in FIGS. 5 and 6. The bushing 62 can define a radial flange 148 and the disk 56 can define a radial groove 146 for receiving the flange 148.

Figure 21:
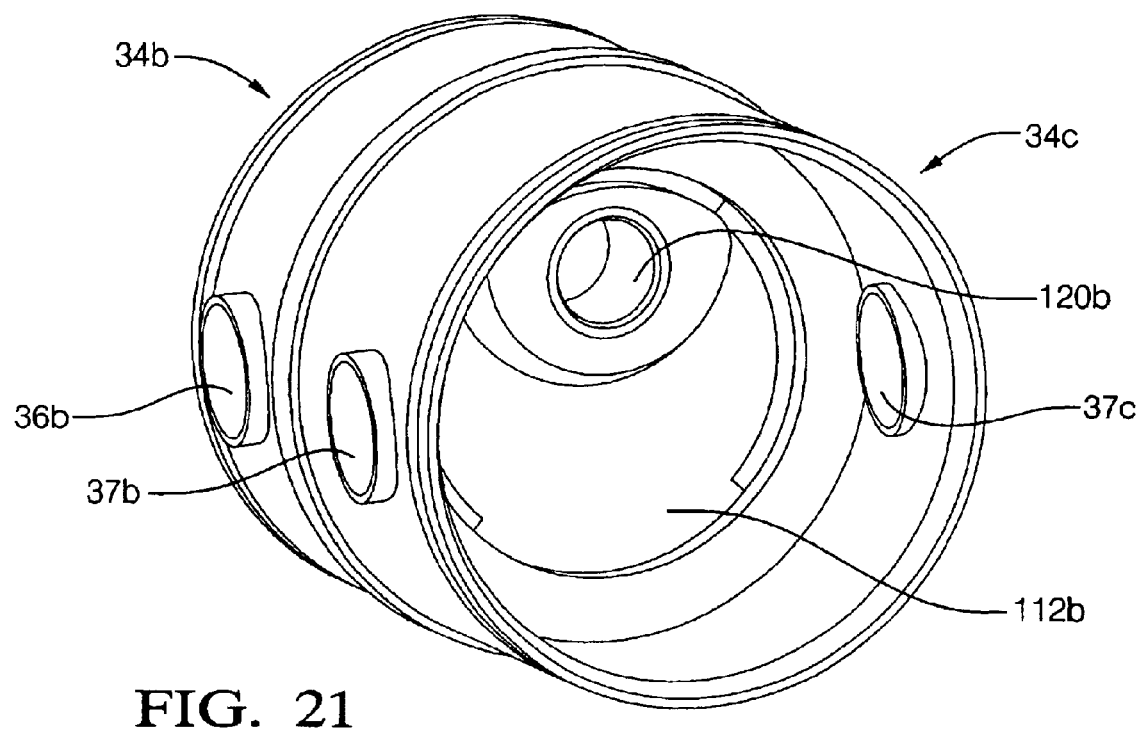
FIG. 21 is a perspective view of the assembly shown in FIG. 20.
Figure 22:
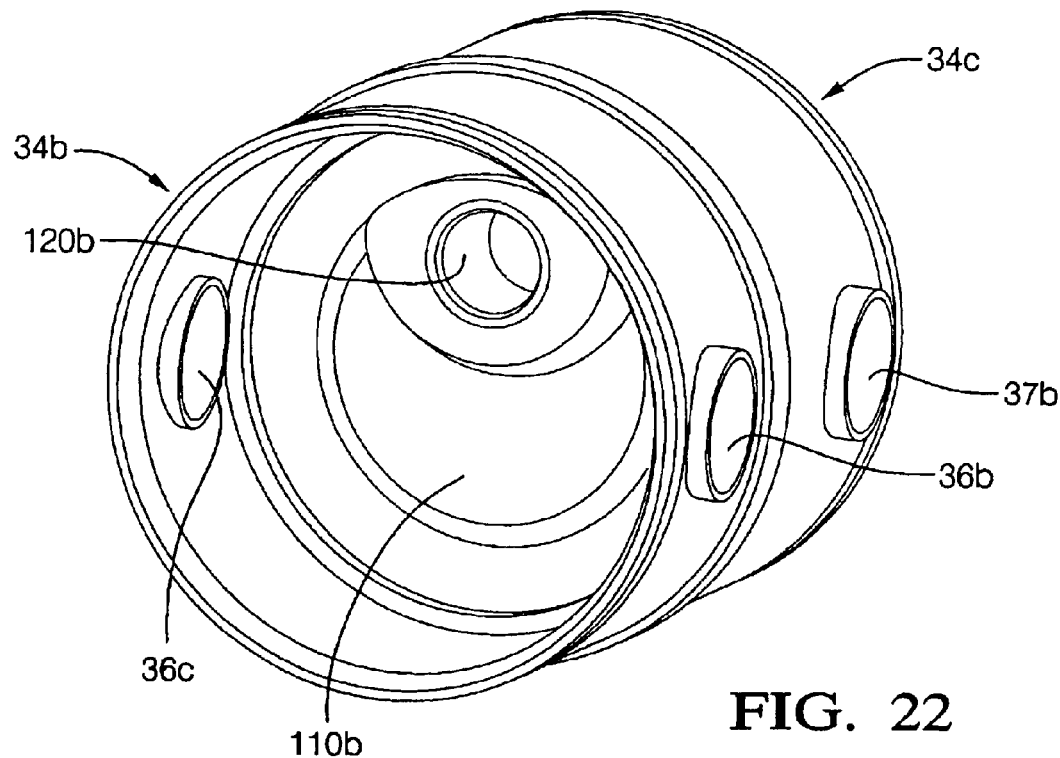
FIG. 22 is a perspective view of the assembly shown in FIG. 20 and shows an opposite end of the assembly with respect to FIG. 21.
Figures 24, 25:
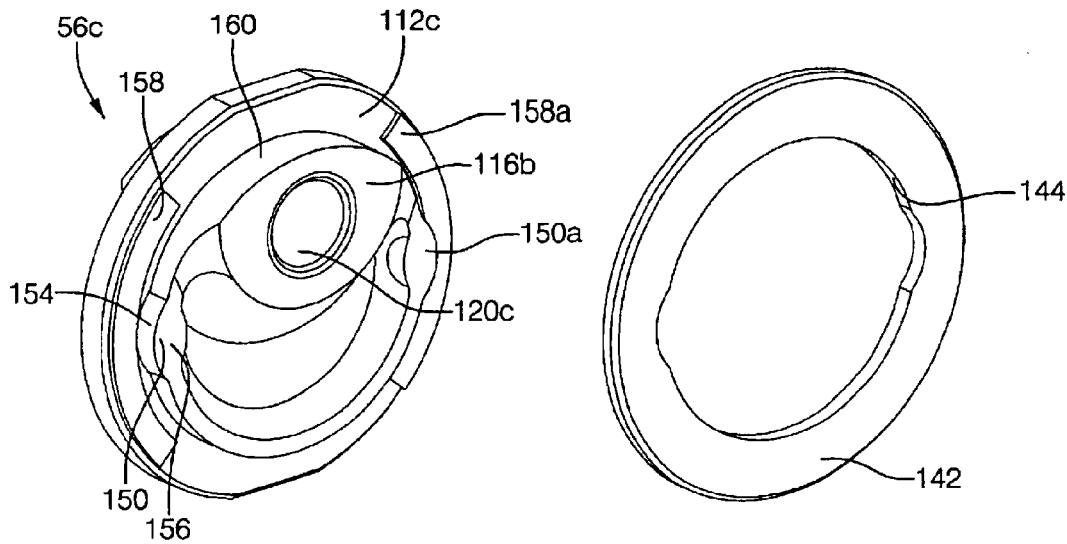
FIG. 24 is a perspective view of a fourth embodiment of a centering disk according to the present invention.
FIG. 25 is a perspective view of a support washer engageable with the centering disk shown in FIG. 24.
Figure 26:
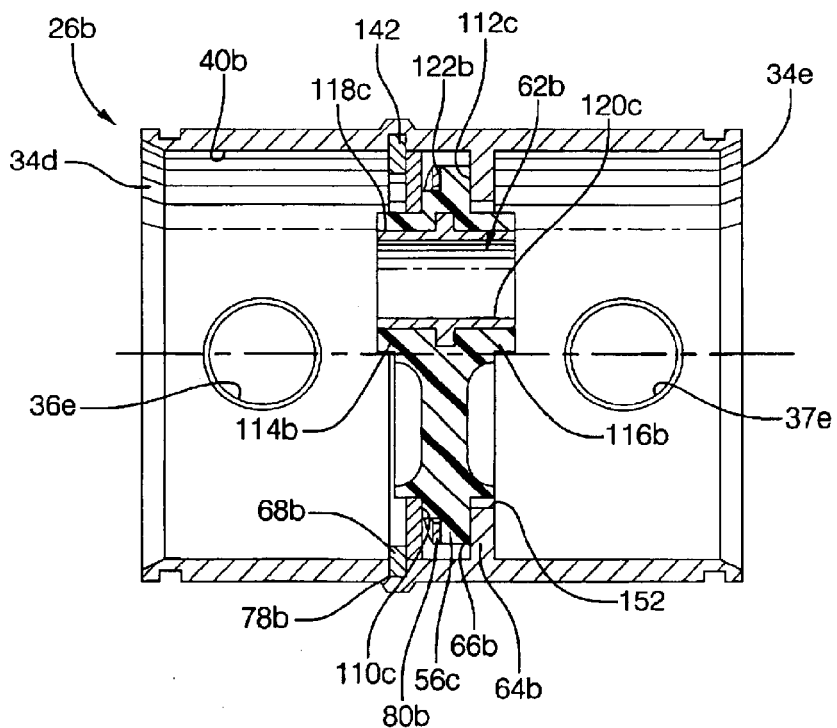
FIG. 26 is a cross-sectional view of an assembly including the centering disk shown in FIG. 24.

The disk 56 can be thickened in portions surrounding the bushing 62 to enhance the support of the bushing 62. For example, the disk 56 can define bosses 114 and 116 surrounding the bushing 62. As shown in FIGS. 16 and 21, a disk 56b can include bosses 114a and 116a surrounding a bushing 62a. The bushing 62a can define an aperture 120b and be positioned in an aperture 118b. As shown in FIGS. 24 and 26, a disk 56c can include bosses 114b and 116b surrounding a bushing 62b. The bushing 62b can define an aperture 120c and be positioned in an aperture 118c.

Referring now to FIGS. 16–23, a second embodiment of the joint 20a includes shaft assemblies 22a, 24a, having universal joints 124a, 126a, respectively. The shaft assemblies 22a, 24a also include ends 32b, 32c, respectively. The joint 20a also includes a sleeve 26a having ends 34b, 34c and an aperture 40a extending between ends 34b, 34c. The sleeve 26a also includes two sets of axially aligned pin holes or openings 36b, 36c, 37b, 37c.

Referring now to FIGS. 24–29, a third embodiment of the joint 20b includes shaft assemblies 22b, 24b, having universal joints 124b, 126b, respectively. The shaft assemblies 22b, 24b also include ends 32d, 32e, respectively. The joint 20b also includes a sleeve 26b having ends 34d, 34e and an aperture 40b extending between ends 34d, 34e. The sleeve 26b also includes two sets of axially aligned pin holes or openings 36d, 36e, 37d, 37e.

Figure 23:
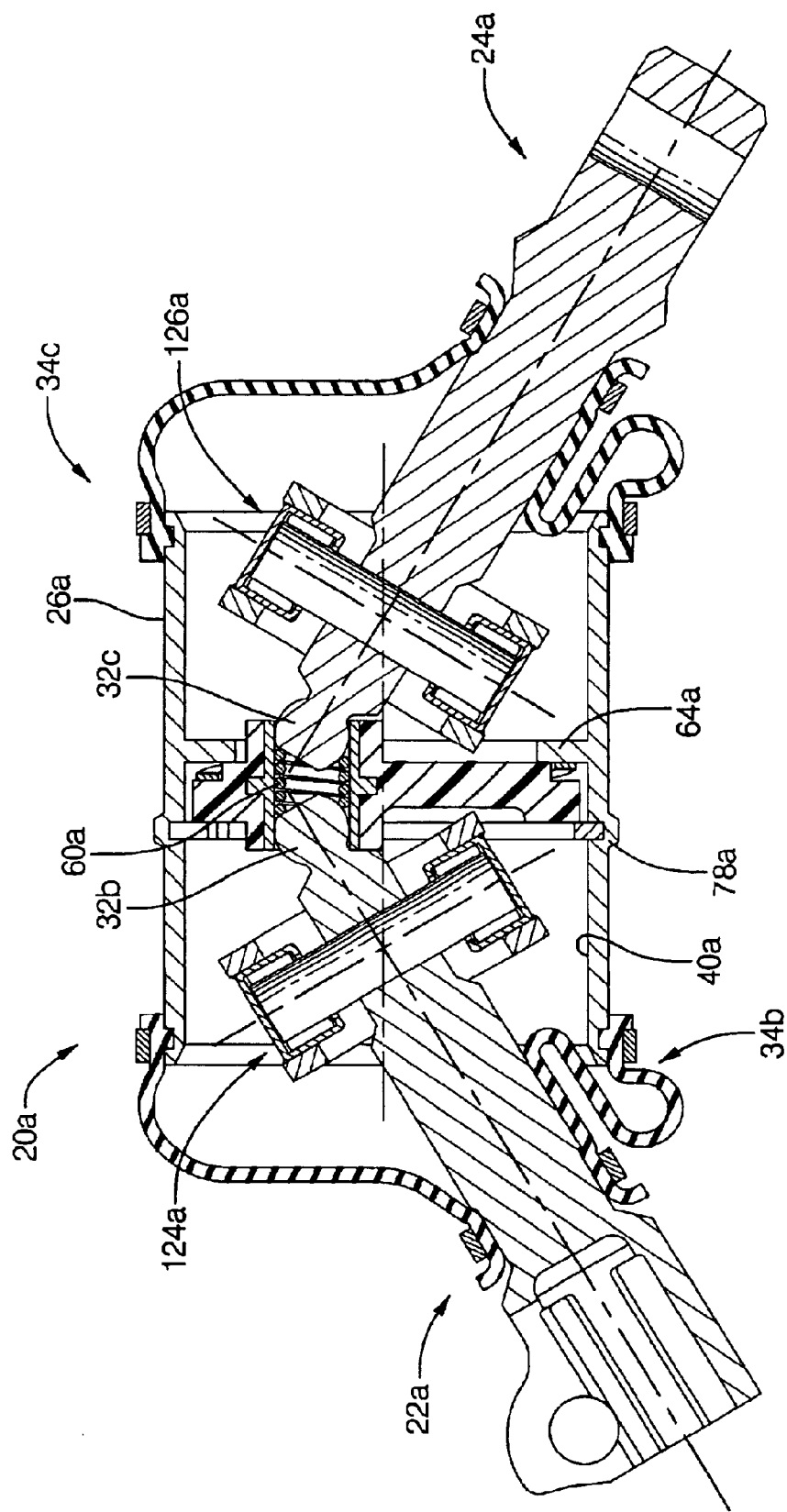
FIG. 23 is a cross-sectional view of a joint assembly including the assembly shown in FIGS. 20–22.
Figure 27:
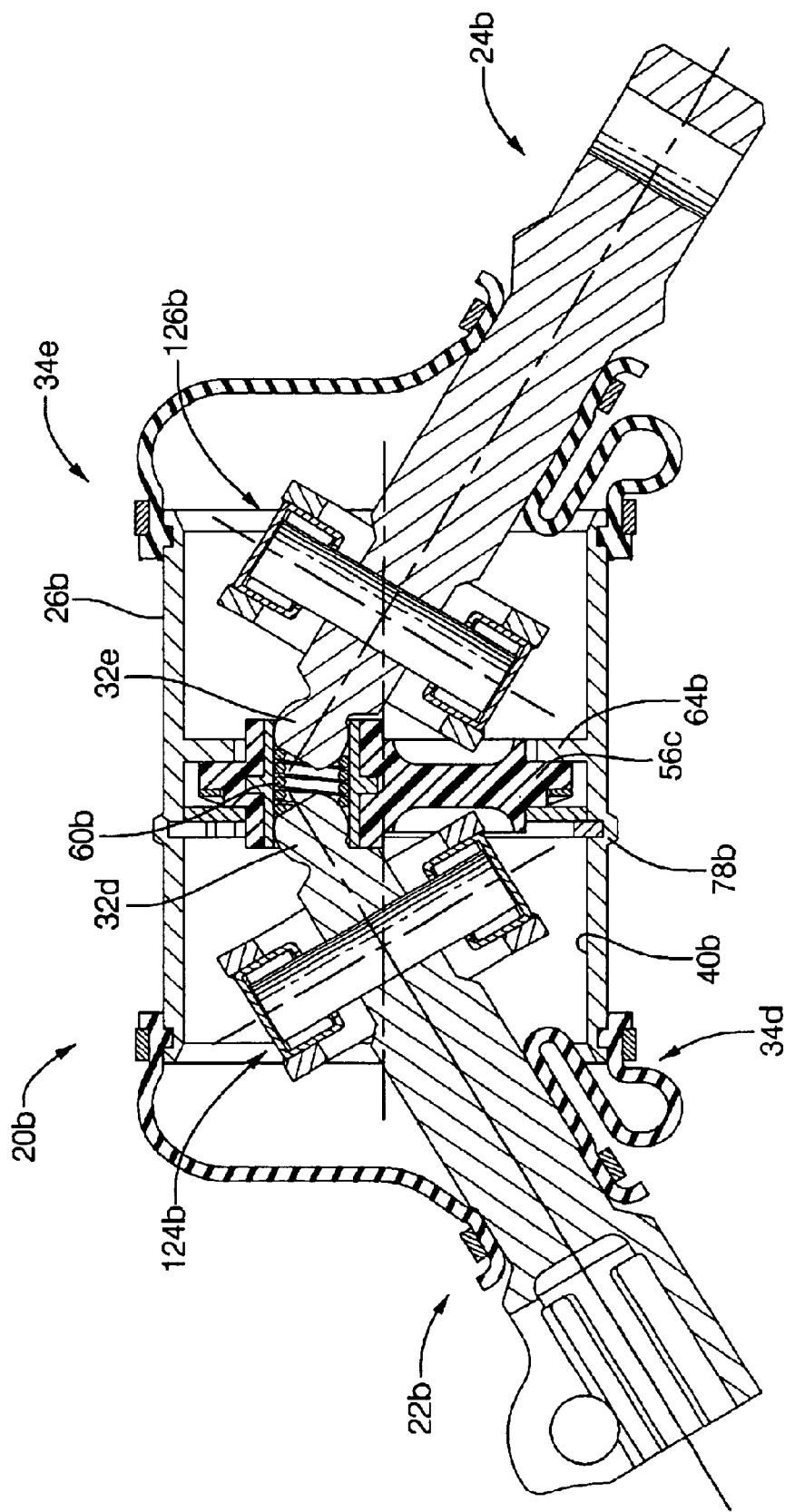
FIG. 27 is a cross-sectional view of a joint assembly including the assembly shown in FIG. 26.
Figure 28:
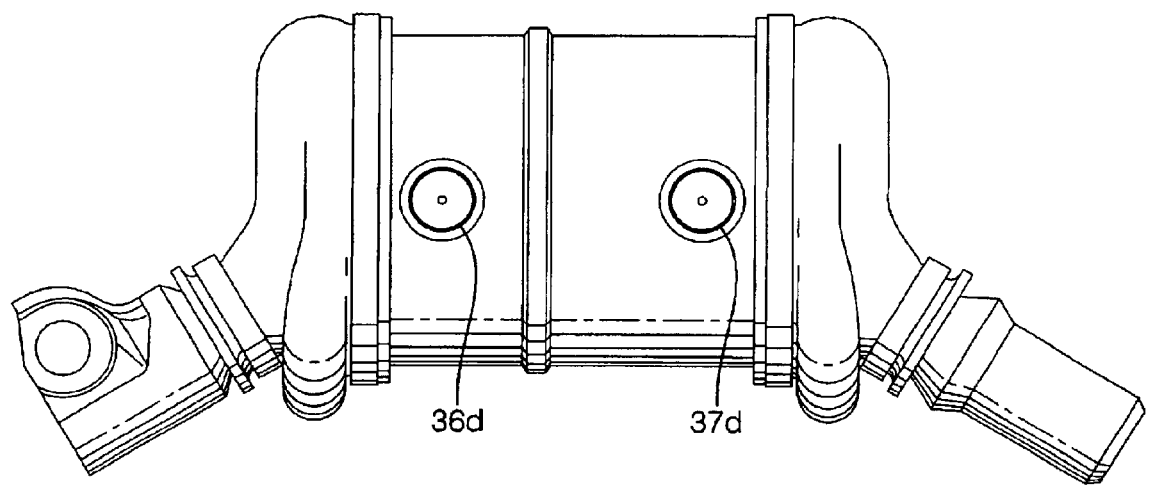
FIG. 28 is a front view of the joint assembly shown in FIG. 26.
Figure 29:
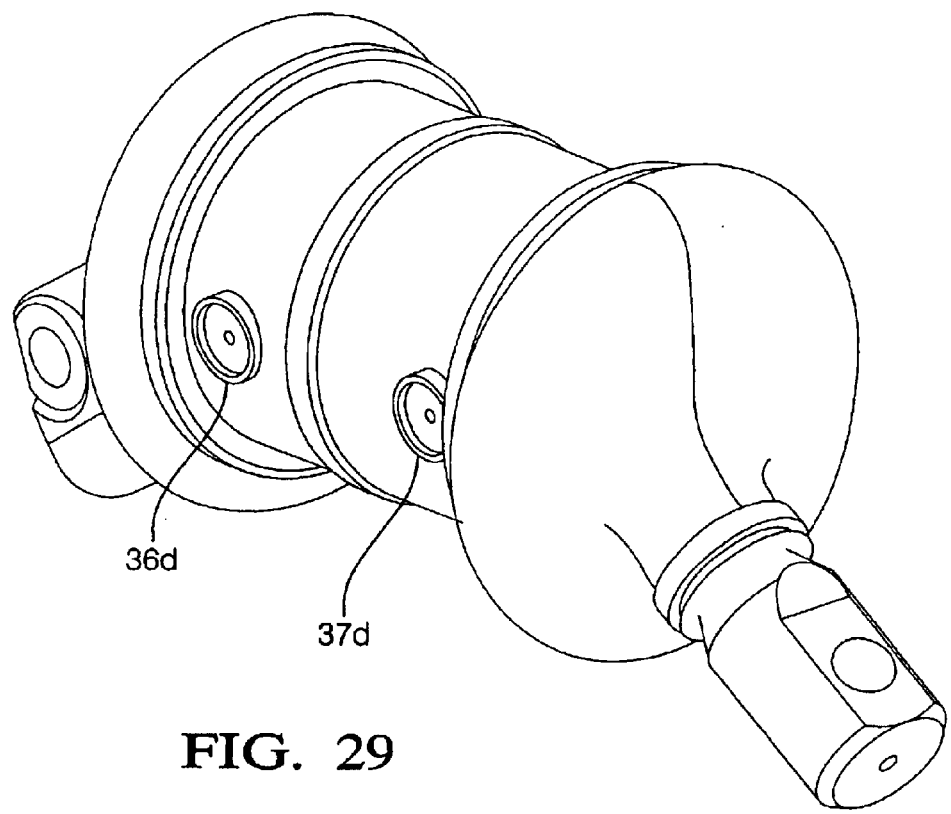
FIG. 29 is a perspective view of the joint assembly shown in FIGS. 26 and 27.

A spring 60, preferably a coil spring, can be positioned within the bushing 62 and act axially outwardly on each of the ends 32, 32a which, because of the angle of the shafts 28 and the dynamics of the joint, has the effect of constantly urging the ends 32, 32a against the bushing 62. During operation of the joint assembly 20, loading imparted by the ends 32, 32a against the bushing 62 can vary in cyclic fashion, enabling the ends 32, 32a to move slightly into and out of contact with the wall, or to shift a small amount during a rotation cycle. The spring 60 can substantially eliminate play between the ends 32, 32a and the bushing 62 by urging the ends 32, 32a against the aperture 120 of the bushing 62. During times in the cycle when the load applied to the ends 32, 32a is lowest, the spring 60 nonetheless compensates by maintaining the ends 32, 32a and contact with the aperture 120 and thus substantially eliminating slop. Referring now to FIGS. 23 and 27, joints 20a and 20b can include springs 60a and 60b, respectively.

Figure 20:
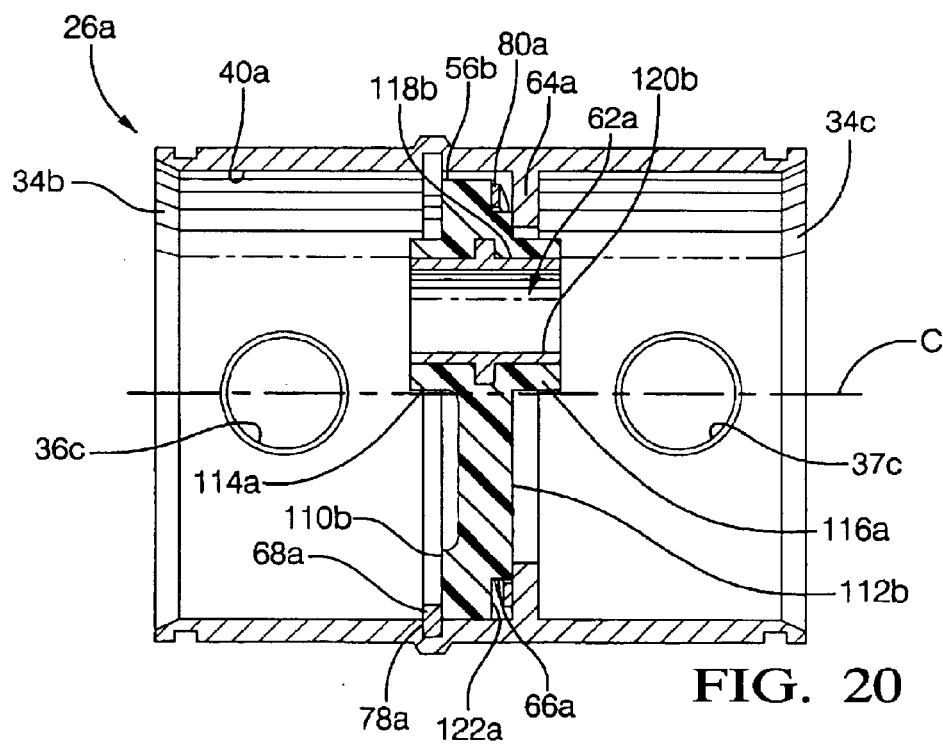
FIG. 20 is a side cross-sectional view of an assembly including the centering disk shown in FIG. 16 positioned in the intermediate coupling member shown in FIG. 18.

Referring now to FIGS. 2 and 5–6, the centering disk 56 can be positioned within the sleeve 26 and be axially moveable relative to the sleeve 26, but is preferably urged to a desired position relative to the sleeve 26. The inner wall of the sleeve 26 can include a radial flange 64 that projects radially inwardly from the aperture 40, defining an engaging or stop surface 66. The surface 66 can be spaced nearer to one end 34a of the sleeve 26 than the other end 34, such that the centering disk 56 can be centrally located between the ends 34, 34a. As is common to all of the embodiments, the sleeve 26 is in the form of a tubular joint body having a generally cylindrical wall presenting a generally cylindrical inner wall surface 40 defining the opening or aperture 40 that extends longitudinally between the opposite open ends 34b, 34c. As seen in the drawings, the inner wall surface 40 is generally uniform in size between the ends 34b, 34c such that the inner wall region 40 that provides radial support to the centering disk is no greater than the size of the inner wall end regions at the open ends 34b, 34c. Referring now to FIGS. 20 and 23, the sleeve 26a can include a radial flange 64a defining an engaging surface 66a. Referring now to FIGS. 26 and 27, the sleeve 26b can include a radial flange 64b defining an engaging surface 66b.

Figure 11:
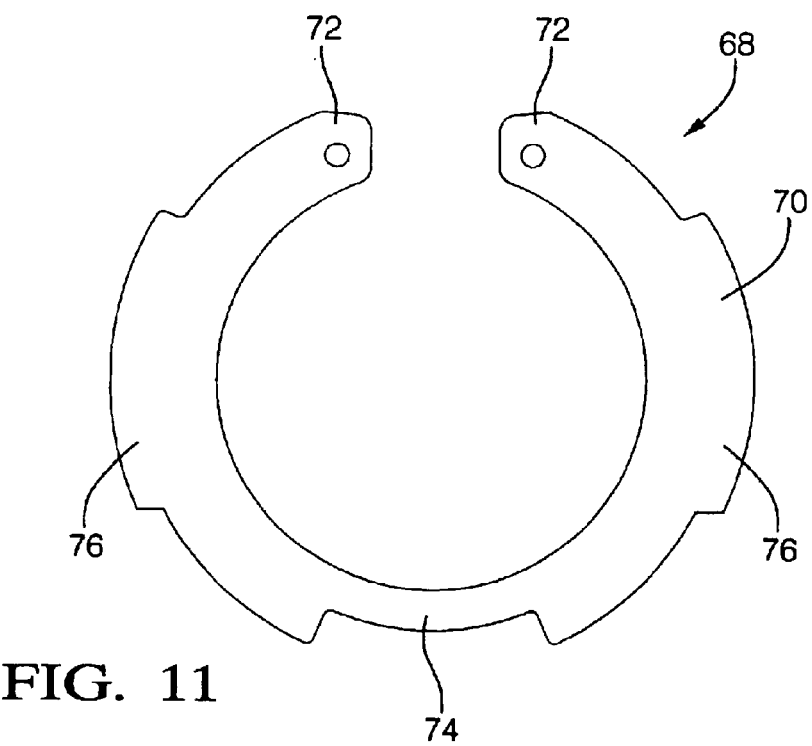
FIG. 11 is a front view of a retaining disk according to the embodiment of the invention shown in FIG. 1.
Figure 12:
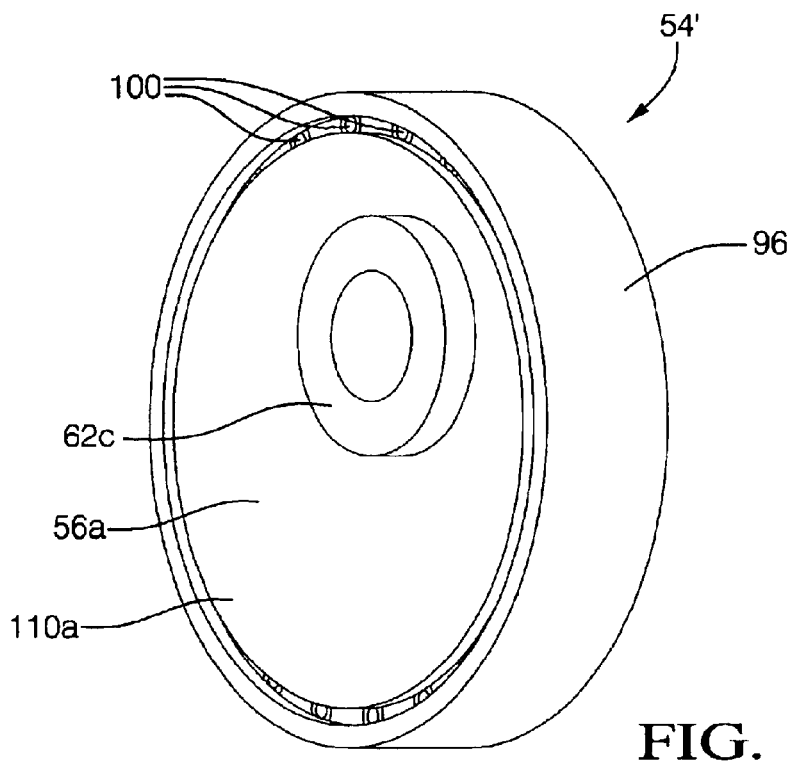
FIG. 12 is a perspective view of a second embodiment of a centering disk according to the present invention.
Figure 13:
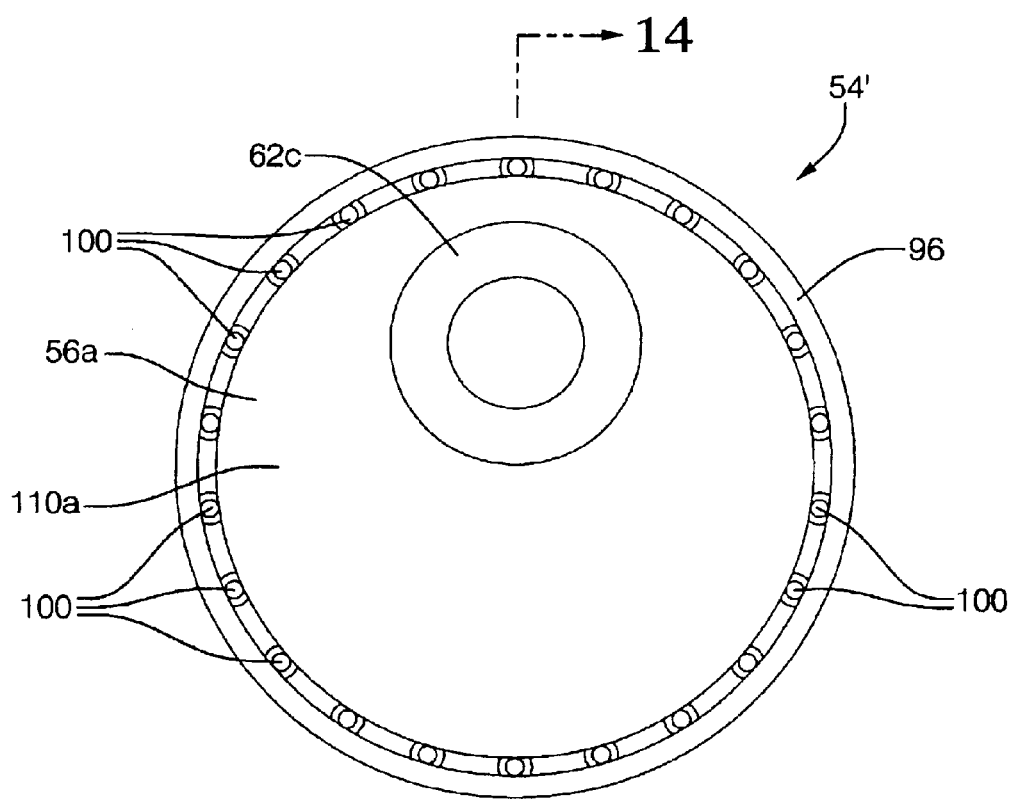
FIG. 13 is a front view of the centering device shown in FIG. 12.
Figure 18:
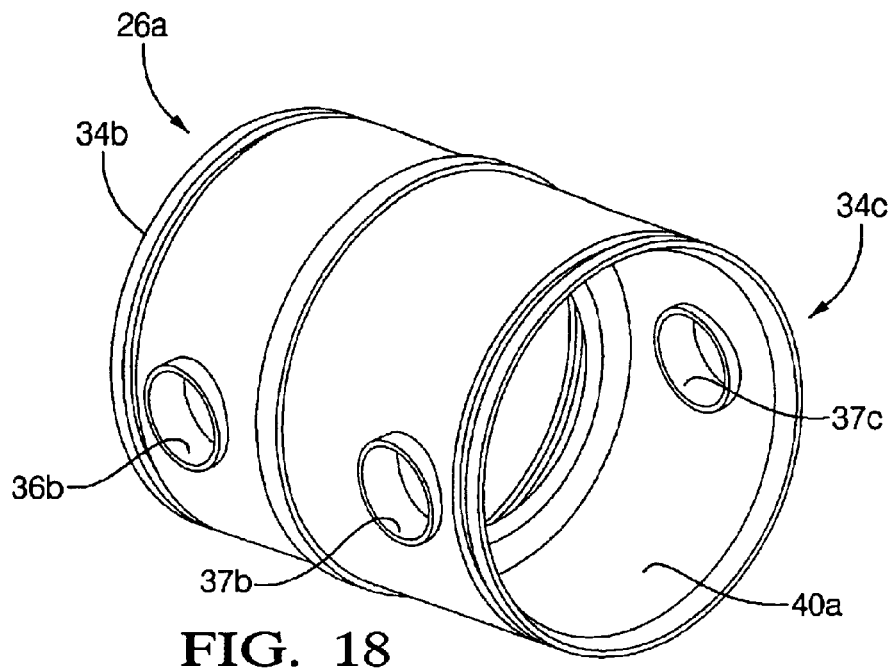
FIG. 18 is a perspective view of a second embodiment of a sleeve or intermediate coupling member according to the present invention.

Referring now to FIGS. 2 and 5–6, spaced from the radial flange 64 is a retaining clip 68 best shown in FIGS. 5, 6 and 11. The retainer clip 68 has a split ring configuration and is made of an elastic metal, such as high carbon steel. The retainer clip 68 has a generally C-shaped body 70 having spaced ends 72 and a narrow mid-section 74. A pair of oppositely directed retention lugs 76 extend outwardly from the body 70 in spaced relation to the ends 72 and midsection 74. The lugs 76 are received in partial retention grooves 78 formed in the inner wall of the sleeve 26 in axially spaced relation to the surface 66. The centering disk 56 can be disposed in the sleeve 26 between the surface 66 and the clip 68. The retainer clip 68 can be removably installed in the sleeve by means of an installation tool which can be extended into openings near the ends 72 of the retainer clip, and the clip 68 compressed by drawing the ends 72 toward one another which effectively decreases the outer dimension of the retainer clip 68 allowing it to be inserted into the open end of the sleeve 26 and into position adjacent the retention groove 78. Once in position, the ends 72 are released and, upon returning, the retention lugs 76 seat into the grooves 78 so as to secure the retainer clip 68 against axial movement relative to the sleeve 26. As such, the retainer clip 68 and radial flange 64 capture the centering disk 56 in the axial direction, while the surface defining the aperture 40 of the sleeve 26 can restrain the centering disk 56 in the radial direction. Removing the clip 68 enables removal of the centering disk 56.

Referring to FIGS. 17 and 20, the invention provides an alternative embodiment of the retaining clip 68a. The clip 68a can define a substantially smooth outer surface 76a. The surface 76a can be received in a radial groove 78a of the sleeve 26a. The groove 78a can be continuous. The clip 68a can engage a surface 110b of the disk 56b. Referring to FIG. 26, a clip 68b can be disposed in a groove 78b.

Figure 19:
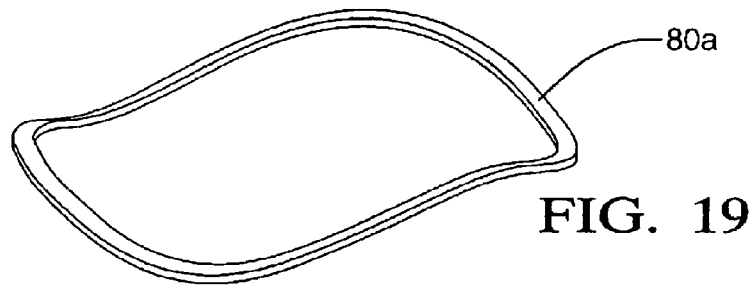
FIG. 19 is a perspective view of a spring washer according to an embodiment of the invention.

Referring now to FIGS. 2 and 5–6, in order to prevent axial play or slop between the centering disk 56 and the radial flange 64 and clip 68, a spring force or biasing device can be introduced into the assembly 20 to urge the centering disk 56 axially in one direction. The disk 56 can include a first surface 110 facing the clip 68 and a second surface 112 facing the surface 66. According to the preferred embodiment, a spring washer 80 can be disposed between the surface 66 and the surface 112 of the centering disk 56 and can be compressed in the axial direction of the sleeve 26 upon installation of the clip 68. The spring washer 80 urges the centering disk 56 away from the surface 66 toward engagement with the clip 68. This constant applied force eliminates or minimizes any axial play of the centering disk 56. Of course, other spring devices may be employed to achieve the axial loading of the centering disk 56, so long as the sleeve 26 remains able to rotate relative to the centering disk 56 in operation, as will be described further below. A perspective view of a spring washer 80a is shown in FIG. 19.

The centering disk 56 can define an annular notch 122 for receiving the spring washer 80. The annular notch 122 can limit movement of the spring washer 80 relative to axis C of the sleeve 26. The notch 122 can be recessed from a center portion of the surface 112. Alternatively, as shown in FIG. 20, an annular notch 122a can be recessed from a radially outer portion of a second surface 112b to receive the spring washer 80a. Alternatively, as shown in FIG. 26, an annular notch 122b can be recessed from a radially outer portion of a first surface 110c to receive a spring washer 80b.

In the embodiment of the invention shown in FIG. 26, the spring washer 80b is positioned between a disk 56c and a support disk 142. The support disk 142 can enhance rotational movement of the disk 56c relative to a sleeve 26b. The support disk 142 can be a steel washer which has been bronze meshed and Teflon coated. The disk 142 can be positioned to absorb relatively high contact forces that can occur between the disk 56c and the sleeve 26b. An interior surface 144 of the disk 142 can correspond to an exterior surface 160 of the disk 56c such that the disk 56c can slide relative to the support disk 142, but rotates concurrently with the disk 142.

Figure 7:
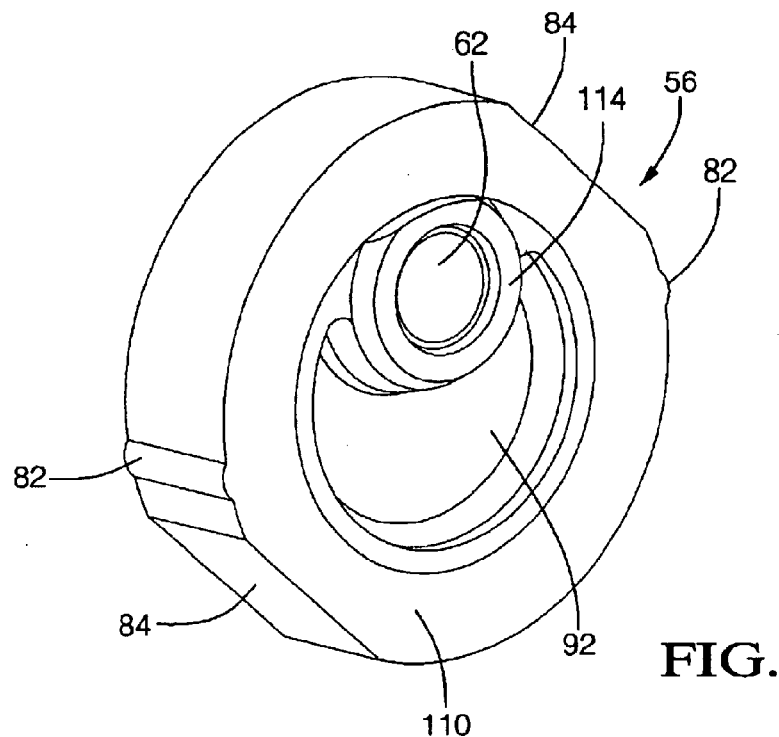
FIG. 7 is a perspective view of a centering disk according to the embodiment of the invention shown in FIG. 1.
Figure 10:
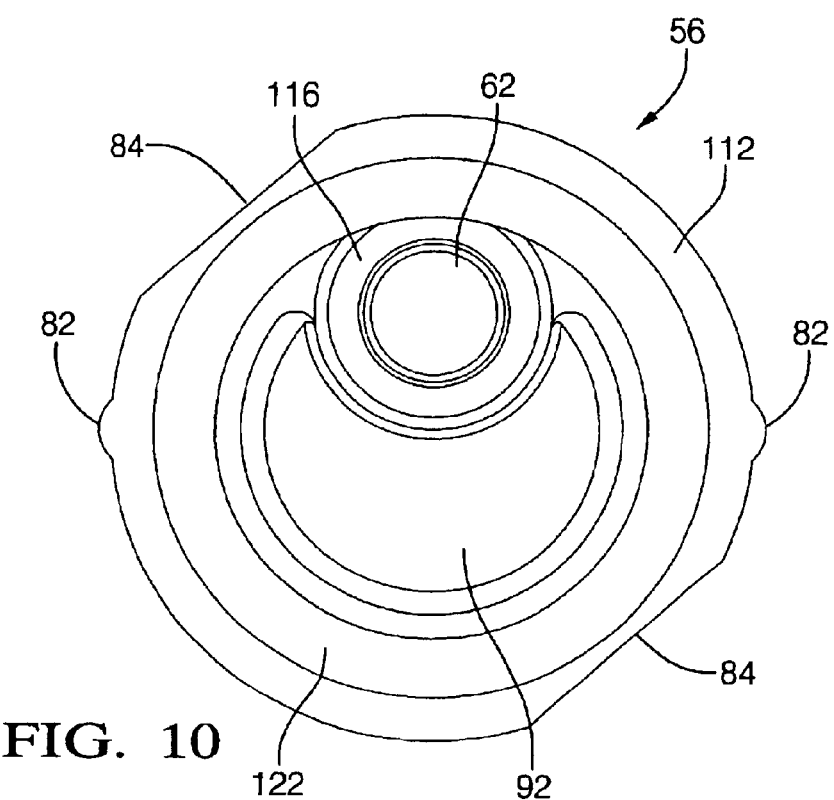
FIG. 10 is a back view of the centering disk shown in FIGS. 7–9.

As shown best in FIGS. 6, 7 and 10, the centering disk can be formed on its outer surface with support tabs or spacer ribs 82 which have a diameter between their outermost points slightly less than the inner diameter of the sleeve 26, and which serve to limit lateral movement of the centering disk 56 within the sleeve 26. The ribs 82 are positioned in a plane containing the axes Y of the bearing pins 52, which plane also passes through the retention grooves 78. The centering disk 56 can be formed with opposing flats 84 to accommodate assembly of the centering disk 56 with the sleeve 26.

The spacing between the Y axes of the bearing pins 52 is preferably less than 60 mm and still more preferably less than 50 mm while achieving a joint angle great than 50° and preferably up to 70° and still more preferably in the range of 58° to 68° between the axes A, B of the shaft assemblies 22, 24. In addition, the sleeve 26 can have an overall end-to-end length of about 80.5 mm, an inner diameter of about 60 mm, and a wall thickness of the sleeve 26 of about 2.75 mm. The sleeve 26 is preferably fabricated of tubular steel such as SAE 1020 material or the like. The pin holes 36, 36a, 37, 37a are preferably fabricated by flow drilling the holes, wherein the material of the sleeve 26 is displaced in the axial direction of the hole to provide an axially thickened wall or bushing 90 extending inwardly of the wall of the sleeve 26 and outwardly of the outer wall of the sleeve 26 in the axial direction of the pin holes 36. The thickened walls 90 are best shown in FIG. 6, and preferably have an axial thickness of about 5 to 6 mm.

As shown best in FIGS. 2 and 7–10, the centering disk 56 is formed with pockets or recesses 92 on laterally opposite sides of the disk adjacent the bushing 62. The recesses 92 each preferably have a depth of about 3.6 mm, and the recesses 92 occupy the space below the bushing 62 on opposite sides of the centering disk 56. The recesses 92 further extend above a center plane containing the retention lugs 76 and wrap partially around the bushing 62. A web 94 of centering disk material between the recesses 92 preferably has a thickness of about 6.25 mm, and is approximately a third of the thickness of the centering disk 56 at the bosses 114, 116. The recesses 92 are positioned to accommodate the axially inwardmost portion of the inner rings 46 when the joint 20 is at high angle, as is illustrated in FIG. 2. Thus, the inner rings 46, at high angle, extend axially inwardly of the outer surface of the centering disk 56 at the bushing 62. With the inner walls 40 received in the recesses 92, the shafts 28 of the shaft assemblies 22, 24 are spaced radially inwardly from the inner wall of the sleeve 26.

In operation, the joint assembly 20 is installed in a vehicle with the shaft assemblies 22, 24 connected to respective driving and driven shafts (not shown) which are set at a predetermined angle relative to one another. This connection effectively fixes the axes A, B of the shaft assemblies 22, 24 at a predetermined angle during operation which does not change with the rotation of the couplings during transmission of torque through the joint 20. As the shaft assemblies 22, 24 rotate through the fixed angle between their axes A, B, the sleeve 26 is caused to rotate about its axis relative to the centering disk 56, which remains stationary in order to achieve constant velocity through the joint 10.

The joint 20 is preferably sealed at its ends by a set of flexible seal boots 95 extending between the shafts 28 and the ends of the sleeve 26 and shrouding the open ends 34, 34a against exposure to the external environment.

FIGS. 12–15 illustrate another embodiment of a centering device 54'. The device includes a centering disk 56a surrounded and supported for rotation by an outer race 96 and by a plurality of bearings 100. The disk 56a can also include a radial groove 132 and the outer race 96 can include a radial groove 136. The bearing members 100 can be positioned in both the grooves 132 and 136. The disk 56a can rotate relative to the outer race 96 about a central axis of the centering device 54'. The disk 56a can include a first surface 110a and a second surface 112a and is preferably fabricated of plastics material. The disk 56a can also define an aperture 118a. The aperture 118a can define the receiving portion of the disk 56a, or the receiving portion can include a bushing 62c for receiving the ends of shafts (not shown).

The centering device 54' is preferably pressed into the sleeve and held by a radial flange and a clip in the manner previously described in connection with the centering device 54. In operation, as the shaft assemblies 22, 24 rotate through a fixed angle between their axes A, B, the sleeve 26 is caused to rotate about its axis C relative to the disk 56 which remains stationary. In this way, torque is transmitted through the joint in an angle which maintaining constant velocity.

The bushing 62c can include a body 127, a first radial flange 128 and a second radial flange 130. The first radial flange 128 can extend substantially transverse with respect to the aperture 120a. The second radial flange 130 can extend at an angle acute to the aperture 120a. The bushing 62c can be moveable relative to the disk member 56a. A resilient washer 134 can be positioned surrounding the body 127 between the disk member 56a and one of the first and second radial flanges 128, 130. In FIG. 14, the resilient washer 134, is shown adjacent the second radial flange 130. The resilient washer 134 can urge the first radial flange 128 to engage the first surface 110a. In operation, the second radial flange 128 can move away from the surface 110A when the resilient washer 134 is compressed between the third radial flange 130 and the disk 56a.

Figure 8:
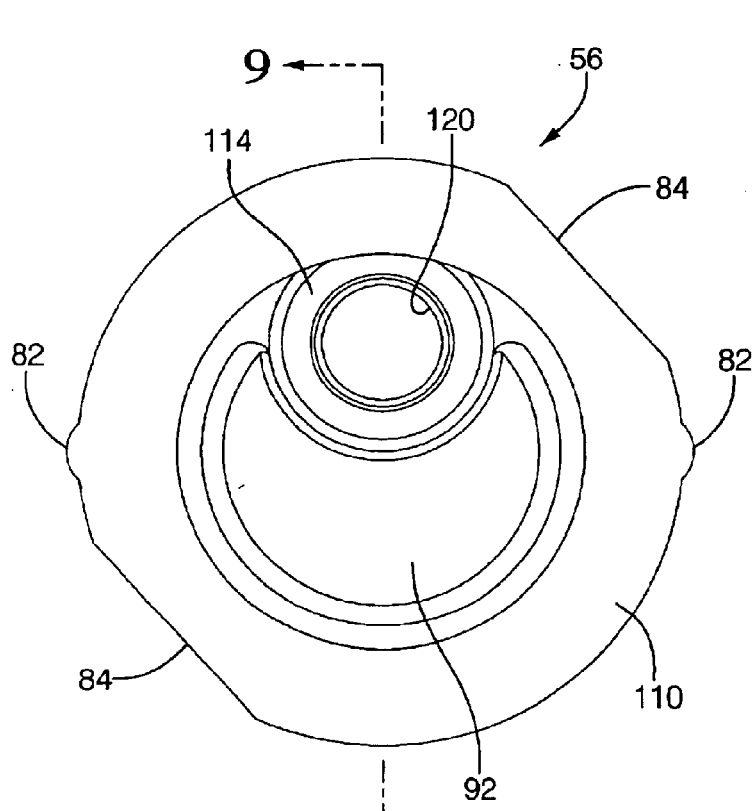
FIG. 8 is a front view of the centering disk shown in FIG. 7.
Figure 9:
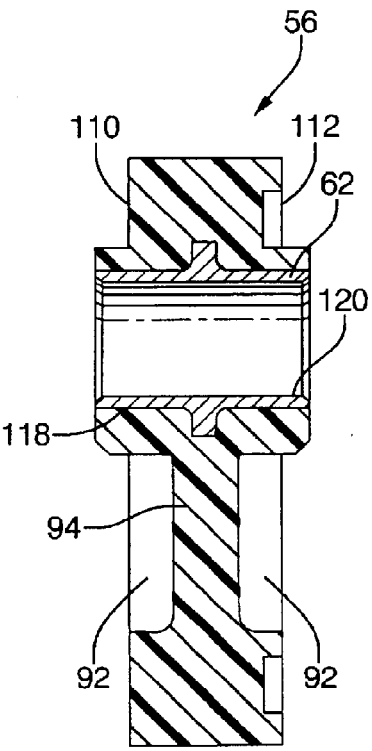
FIG. 9 is a cross-sectional view of the centering disk shown in FIGS. 7 and 8.

The joint according to the invention can also include a plurality of support tabs for supporting bearing engagement between the centering disk and the intermediate coupling member. Referring now to FIGS. 7–8 and 10, the centering disk 56 can include a plurality of support tabs 82 extending radially. The tabs 82 can engage the aperture 40 of the sleeve 26 and reduce the contact area between the centering disk 56 and the sleeve 26.

Referring now to FIGS. 24 and 26–27, the centering disk 56c can include tabs 150, 150a. The tabs 150, 150a can extend from a second surface 112c and can include a radial surface 154 and an axial surface 156. Tabs 150 and 150a can engage an interior surface 152 of the radial flange 64b. The radial surface 154 can engage the surface 152 of the radial flange 64b. Similarly structured tabs can be disposed on the first side 110c of the disk 56c and engage the surface 144 of the support disk 142. The centering disk 56c can also include support tabs extending and supporting longitudinally. For example, tabs 158, 158a can extend outwardly from the second surface 112c and engage the surface 66b of the radial flange 64b.

The features of the invention described in detail above can be incorporated in other joints. For example, cardan joints can include receiving portions including projections, such as shown in U.S. Pat. No. 724,068. The teachings of the present invention can be applied to centering disks including projections. Also, cardan joints can include receiving portions including a pair oppositely facing, blind holes, such as shown in U.S. Pat. No. 3,470,712. The teachings of the present invention can be applied to centering disks including a pair oppositely facing, blind holes. The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and not to be in any way limiting, the invention may be practiced otherwise than as specifically described.

What is claimed is:

1. A cardan joint comprising:
   first and second shafts wherein each shaft has an end;
   first and second universal joints individually connected to said first and second shafts adjacent said respective ends;
   an intermediate coupling member positively connected with said first and second universal joints wherein each of said first and second universal joints and both shaft ends being positioned in said intermediate coupling member and wherein said intermediate coupling member comprises a tubular joint housing having a generally cylindrical housing wall presenting a generally cylindrical inner wall surface extending longitudinally between longitudinally spaced open ends of said joint housing defined by circumferentially continuous end portions of said joint housing, and wherein said open ends are about the same size as that of said inner wall surface of said joint housing; and
   a centering disk positioned in said joint housing and supported radially by said inner wall surface of said joint housing between said first and second universal joints and having a receiving portion engaging both shaft ends which is moveable longitudinally in said joint housing.

2. The cardan joint of claim 1 wherein said centering disk includes a disk member defining an aperture and said receiving portion comprising a bushing positioned in said aperture.

3. The cardan joint of claim 2 wherein said bushing (62c) is movable relative to said disk member (56a).

4. The cardan joint of claim 3 wherein said bushing (62c) includes a body (127) and first and second radial flanges (128, 130) extending from opposite ends of said body (127) wherein said disk member (56a) is positioned between said first and second radial flanges (128, 130).

5. The joint 4 including a resilient washer (134) positioned surrounding said body (127) between said disk member (56a) and one of said first and second radial flanges (128, 130).

6. The cardan joint of claim 4 wherein one of said first and second radial flanges (128, 130) extends transverse to said body (127) and the other of said first and second radial flanges (128, 130) extends at an acute angle relative to said body (127).

7. The cardan joint (20, 20a, 20b) of claim 2 wherein said disk member (56, 56a, 56b, 56c) includes a radial groove and said bushing includes a radial flange receiving in said radial groove.

8. The cardan joint of claim 1 including a biasing device urging said receiving portion longitudinally in said joint housing.

9. The cardan joint of claim 8 wherein said biasing device comprises a spring washer.

10. The cardan joint of claim 9 wherein said centering disk includes an annular notch and said spring washer is positioned at least partially in said annular notch.

11. A cardan joint comprising:
    first and second shafts wherein each shaft has an end;
    first and second universal joints individually connected to said first and second shafts adjacent said respective ends;
    an intermediate coupling member positively connected with said first and second universal joints wherein each of said first and second universal joints and both shaft ends being positioned in said intermediate coupling member and wherein said intermediate coupling member comprises a tubular joint housing having a generally cylindrical housing wall presenting a generally cylindrical inner wall surface extending longitudinally between longitudinally spaced open ends of said joint housing defined by circumferentially continuous end portions of said joint housing, and wherein said open ends are about the same size as that of said inner wall surface of said joint housing; and
    a centering disk positioned in said joint housing between said first and second universal joints and supported radially by said inner wall surface of said joint housing and having a receiving portion engaging both shaft ends; and
    a spring positioned in said joint housing between said shaft ends.

12. The cardan joint of claim 11 wherein said spring is positioned in said receiving portion.

13. A cardan joint, comprising:
    first and second universal joints each rotatable about a respective joint axis and each having an inner end portion;
    a tubular joint housing having a generally cylindrical housing wall defining a generally cylindrical inner wall surface that extends longitudinally of said joint housing between longitudinally spaced open ends of said joint housing defined by circumferentially continuous end portions of said housing wall;
    two sets of axially aligned pin holes formed in said housing body in longitudinally spaced relation to one another and in longitudinally spaced relation to said open ends of said joint housing;

said first and second universal joints extending into said tubular joint housing through said open ends of said joint housing and each supporting a set of bearing pin members projecting from said first and second universal joints into said pin holes to establish a jointed connection between said universal joints and said joint housing for rotation of said joint housing in response to rotation of said first and second universal joints about their respective axes;

a centering disk received in said joint housing between said first and second universal joints and supported radially by said inner wall surface of said joint housing to enable rotation of said joint housing about said centering disk during operatives of said cardan joint, said centering disk having a socket portion arranged eccentrically relative to said central axis of said centering disk in which said end portions of said first and second universal joints is received to couple said end portions together through said centering disc;

said joint housing including a stop surface extending radially inwardly of said inner wall surface to limit longitudinal movement of said centering disc within said joint housing in one longitudinal direction;

a snap ring removably installed in said joint housing in longitudinally spaced relation to said stop surface on the opposite side of said centering disk to limit longitudinal movement of said centering disk within said joint housing in the opposite longitudinal direction and to enable the selective removal of said centering disk from said joint housing through one of said open ends upon removal of said snap ring; and a biasing member disposed between said centering disc and one of said stop surface and snap ring and acting to constantly urge said centering disk in one longitudinal direction relative to said joint housing.

14. The cardan joint of claim 13 wherein said generally cylindrical open ends of said joint housing are no smaller than said gene ally cylindrical inner wall surface.

15. The cardan joint of claim 13 wherein said centering disc includes longitudinally recessed portions adjacent said socket portion for receiving a portion of said first and second universal joints when said cardan joint is moved to a greatest angle position.

16. The cardan joint of claim 15 wherein said universal joint is spaced from said end portions of said joint wall when said cardan joint is moved to said greatest angle position.

* * * * *